Nov. 17, 1953     A. W. HARZ     2,659,624
SPRAY BOOM
Original Filed Dec. 1, 1944     5 Sheets-Sheet 1
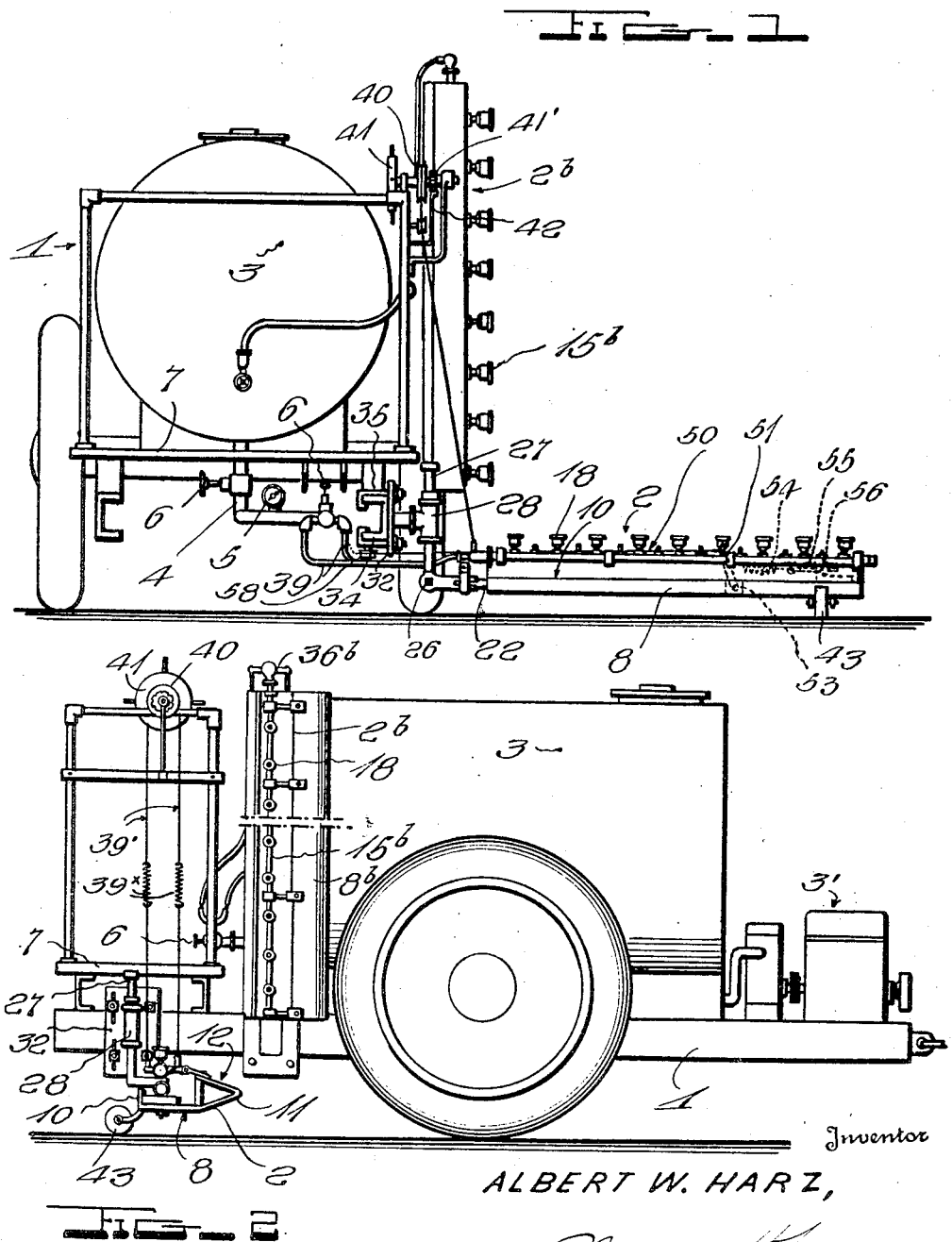
Inventor
ALBERT W. HARZ,

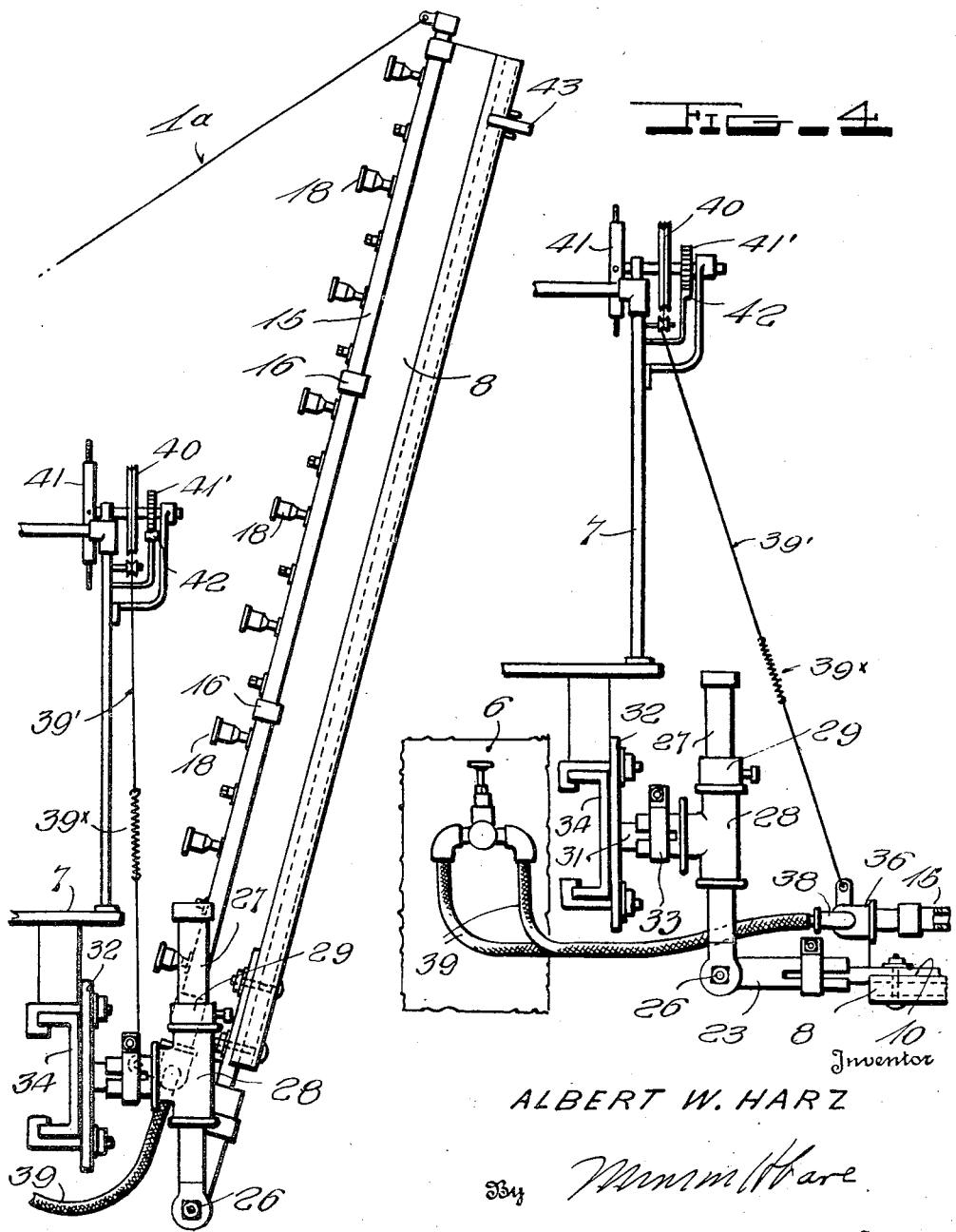

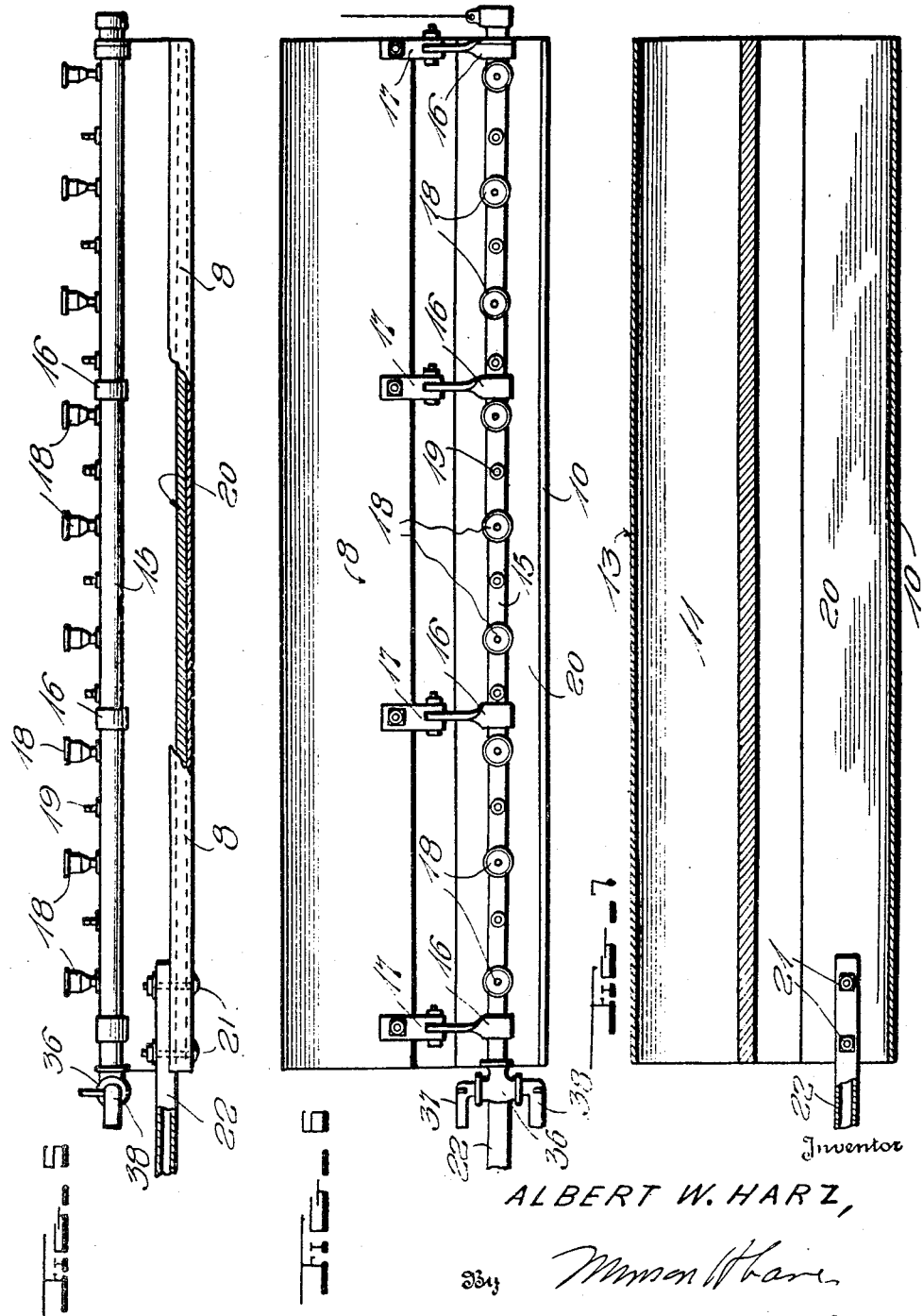

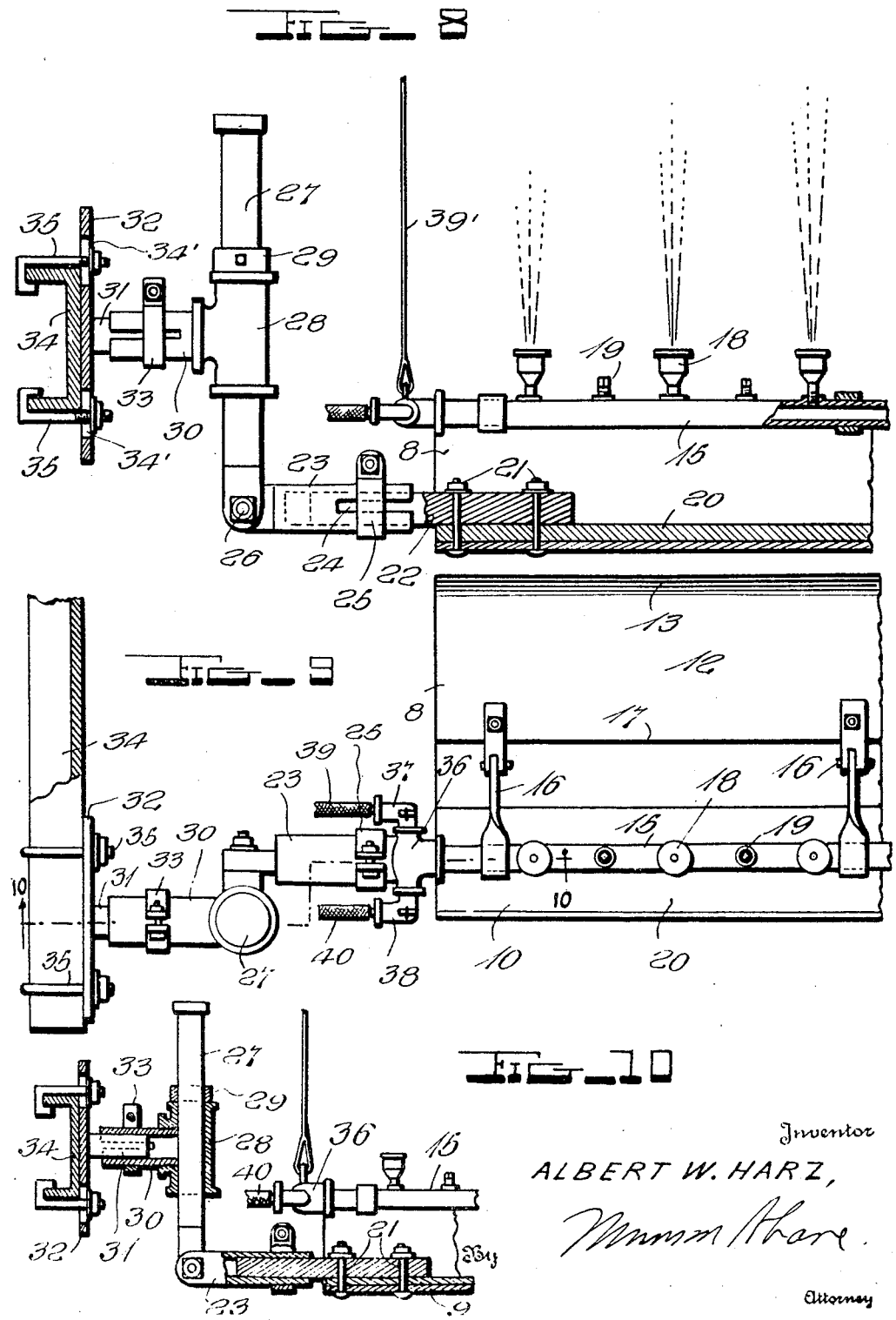

Nov. 17, 1953  A. W. HARZ  2,659,624
SPRAY BOOM
Original Filed Dec. 1, 1944  5 Sheets-Sheet 5
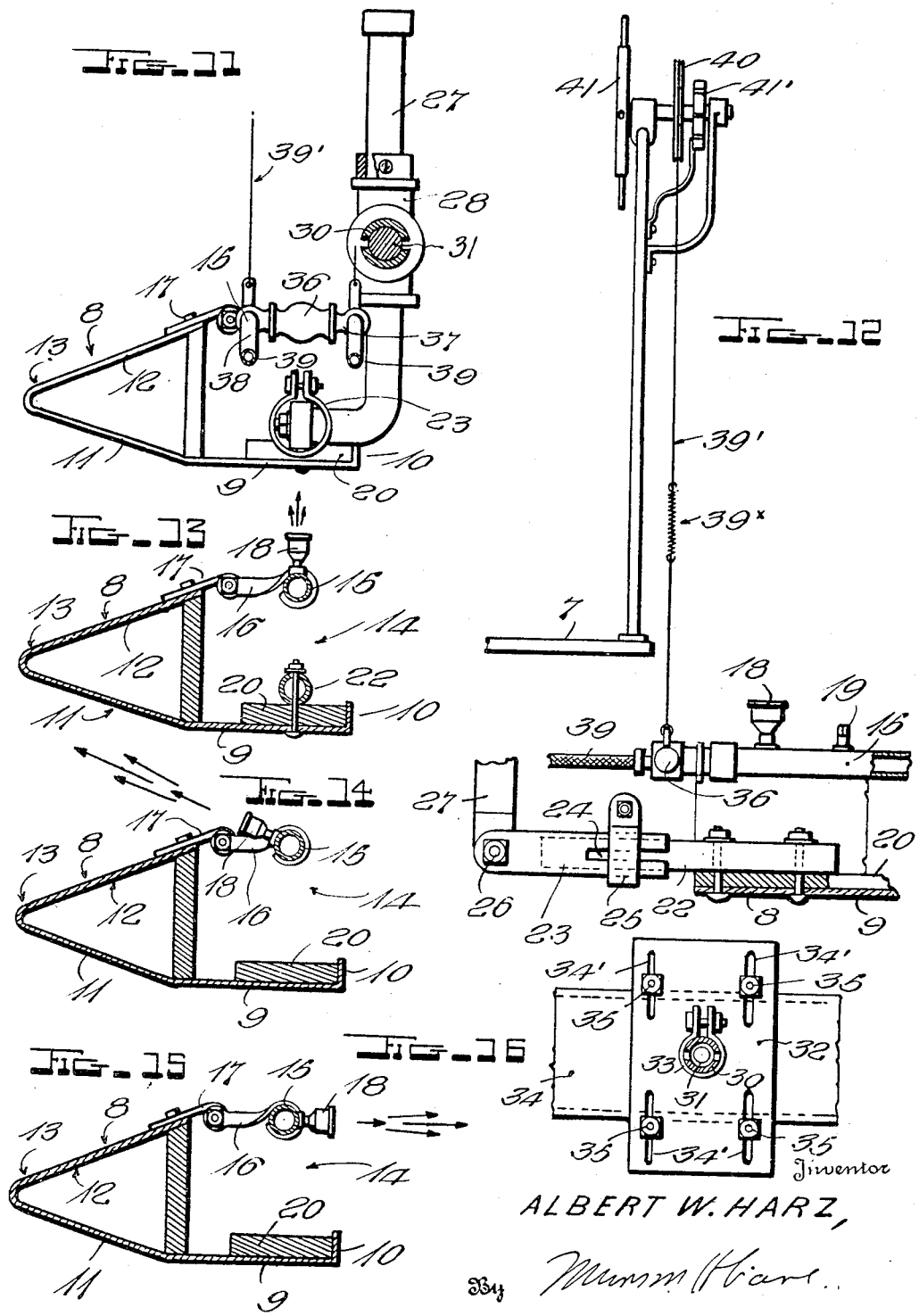
Inventor
ALBERT W. HARZ,
By
Attorney Patented Nov. 17, 1953

2,659,624

UNITED STATES PATENT OFFICE 2,659,624

SPRAY BOOM

Albert W. Harz, Orlando, Fla.

Continuation of application Serial No. 663,081, April 18, 1946, which is a division of application Serial No. 566,214, December 1, 1944. This application February 12, 1952, Serial No. 271,144

12 Claims. (Cl. 299—41)

This invention relates to sprayers of the spray boom type for spraying trees or various kinds of plants or growing vegetation, and has special reference to sprayers in which the liquid or solution to be sprayed is contained within a storage tank suitably mounted with the boom for travel over the ground and in which the spray liquid or solution is delivered by a suitable pumping mechanism under high pressure to the spray boom for discharge in the form of spray against the growing vegetation.

The present application is a continuation of my prior application Serial No. 663,081, filed April 18, 1946, which in turn is a division of an earlier application Serial No. 566,214, filed December 1, 1944, and now abandoned, relating to improvements in sprayers of this character.

It has heretofore been a practice to employ horizontal spray booms arranged to travel at a level more or less high above the ground to spray vegetables or like growing crops, such booms having nozzles positioned below the boom and spray pipe to discharge a spray solution downwardly on the crop. It has also heretofore been a practice to employ vertical spray booms or other spraying apparatus for spraying fruit or other trees from a traveling vehicle at different horizontal levels or at a more or less high level from which the spray is discharged horizontally or upwardly or downwardly. It has also been a practice to employ sprayers handled by operators walking along the ground and alongside a spraying machine to discharge spray horizontally or at different angles against trees. So far as I am aware, however, no sprayers mounted for horizontal travel beneath the limbs of trees and having longitudinally spaced nozzles protected by suitable guard means and arranged to direct the spray upwardly through and between the limbs of trees have ever, prior to my invention, been employed. The disadvantage of spraying trees from a traveling vehicle at a high level or by the use of sprayers carried by operators walking on the ground, however, is that the lower branches of the trees cannot be reached or adequately sprayed or sprayed to any efficient degree without drenching operations, causing waste of spray. Because of this fact, and by reason of the use of sprayers carried by operators walking on the ground in an attempt to overcome this objection, the amount of spray used is excessive and the operation of spraying many trees of an orchard, for example, is time consuming, laborious and expensive.

One object of my invention is to provide an elongated spray boom construction which overcomes these objections and wherein the boom is mounted to travel horizontally on or in close proximity to the ground and beneath the lowest lying limbs of trees, and has its nozzles spaced longitudinally and arranged to direct the spray upwardly so that all limbs of the tree may be reached and thoroughly sprayed.

Another object of the invention is to provide a spray boom which will pass over a cover crop and move the same without injury thereto out of the path of the boom and thereafter permit the crop to return to its normal upright position, and to provide a spray boom which will lift the low lying limbs of trees off the ground or to a suitable elevation above the ground and spread the libs to allow the discharging spray to cover such limbs and to pass upwardly for an effectual spraying of the higher limbs of the trees.

Still another object of my invention is to provide a spray boom construction which embodies novel guarding or shielding means to protect the nozzles from injury while allowing contact of the boom with low lying and other limbs or branches of the plants for the purpose of bringing the same into the spray zone or field of the boom without interference with the spraying action of the nozzles carried by the boom.

Another object of the invention is to provide a spray boom construction which is designed to travel close to the ground and to raise the low lying limbs or branches of trees or plants and free the same from other growing vegetation and spread the portions thereof so that such portions of the trees or plants may be effectually sprayed.

Still another object of the invention is to provide a spray boom having means for pushing down the cover crop ahead of the spray nozzles so that the discharging spray may freely reach the tree foliage without interference from the growing vegetation, which means will pass over the cover crop without causing injury thereto so as to allow the crop to regain its normal upright position after spraying of the low lying parts of the tree foliage has been accomplished.

Still another object of the invention is to provide a sprayer in which the spray boom is underslung or disposed at a low level on a carrier vehicle for travel on or in close proximity to the ground surface and so as to adjust or adapt itself to varying levels in the ground surface, and in which the spray boom is operative for discharging the spray horizontally, vertically, or at various angles between the vertical and horizontal in order that the spray may be discharged in a manner best suited to thoroughly cover all portions of the branches of trees or growing vegetation.

Still another object of the invention is to provide a spray boom having means for pushing down the cover crop ahead of the spray nozzles so that the discharging spray may freely reach the tree foliage without interference from the growing vegetation, which means will pass over the cover crop without causing injury thereto so as to allow the crop to regain its normal upright position after spraying of the low lying parts of the tree foliage has been accomplished.

Still another object of the invention is to provide a sprayer in which the spray boom is underslung or disposed at a low level on a carrier vehicle for travel on or in close proximity to the ground surface and so as to adjust or adapt itself to varying levels in the ground surface, and in which the spray boom is operative for discharging the spray horizontally, vertically, or at various angles between the vertical and horizontal in order that the spray may be discharged in a manner best suited to thoroughly cover all portions of the branches of trees or growing vegetation.

Still another object of the invention is to provide a boom construction which dispenses with the use of walking operators to spray the trees manually and in which all controls for operating the boom and the carrier vehicle are preferably placed within the reach of the driver of the vehicle, thus effecting a reduction in the number of operators required and a material saving in the cost of operating the machine.

Still another object of the invention is to provide a low underslung spray boom in which the spray pipe and nozzles are at least partially enclosed and covered by a guard or shield serving to protect such spray elements as bottom and top from injury while serving to lift low branches of trees or other plants in order to adapt the same to be efficiently sprayed.

Still another object of the invention is to provide a spray boom embodying a novel form and construction of guard and construction and arrangement of spraying means therein, including an oscillatable sprayer and guard movable to different spraying positions or to spray throughout a given arc, whereby the strength of the boom and its working efficiency for different spraying actions are materially increased as compared with spray booms of the types heretofore in use.

Still another object of the invention is to provide a spray boom which is mounted on a tank carrying vehicle so as to be movable from a horizontal working position, in which it projects laterally at one side of the vehicle, to a vertical inoperative position, so that the apparatus when not in use or being transported from place to place may travel with the boom in a position in which it is not liable to be injured, and which also adapts the apparatus to be transported, parked or stored in a comparatively small space.

Still another object of the invention is to provide a spray boom which is adjustable to work at different levels on a carrier vehicle or to suit frame structures of different carrier vehicles, and to have vertical movement so as to ride without injury over stones or other ordinary ground obstructions.

Still another object of the invention is to provide a spray boom which may be allowed to swing free on encountering an obstruction which it cannot freely pass in order to prevent damage to the boom or any of its parts.

Still another object of the invention is to provide a spray boom of the construction described which may be mounted vertically on a carrier vehicle for use in connection with a horizontally mounted boom and whose spray pipe may be operated and oscillated, if desired, in unison with the spray pipe of the horizontal boom.

Still another object of the invention is to provide a spray boom which is simple of construction, reliable and efficient in operation, capable of ready application to different carrier vehicles, and adapted to be easily kept in working order and manufactured and sold at a comparatively low cost.

Still another and particular object of the present invention is to provide a spray bar or boom in which a spray pipe forms the body of the boom and in which guarding or shielding means which protects the nozzles from injury comprises shield members or plates welded or otherwise secured to the pipe.

Still another object of the invention is to provide a novel arrangement of nozzles whereby the trunks of trees as well as the limbs thereof may be effectively sprayed.

Still another object of the invention is to provide means for mounting the boom which permits relative vertical motion between the vehicle and boom to prevent injury to the boom or its connections in the event of either the wheels of the vehicle or the boom dropping into a hole, ditch or depression in the ground.

Still another object of the invention is to provide the boom with means for preventing undue spreading of the spray as it leaves the nozzles so as to increase its trajectory range and prevent waste of spray in the region of the boom, and also to provide means for extending the length of the boom when desired or required.

Still another object is to provide fender means for fending grass or other vegetable growth away from the nozzles and associated means for holding the boom in working position and allowing its release to prevent injury thereto when encountering an obstruction.

Still another object of the invention is to provide novel means for mounting the boom to swing horizontally when encountering an obstruction to prevent injury thereto, which means will automatically maintain the boom in a normal working position and is adjustable to vary this position relatively to the carrier vehicle.

Still another object of the invention is to provide means for supporting the boom which permits the boom to move upward when encountering an obstruction and to pass over the obstruction without injury, and which, as soon as the boom passes the obstruction, will automatically allow the boom to return to its working position.

With these and other objects in view, which will appear in the course of the subjoined description, the invention consists of certain novel features of construction, combination and arrangement of parts, as hereinafter described and claimed, and as shown in the accompanying drawings, in which:

Fig. 1 is an end elevation of a carrier vehicle, showing the application of my improved spray booms thereto;

Fig. 2 is a side elevational view of the same;

Fig. 3 is a sectional end elevation of parts disclosed in Figs. 1 and 2 on an enlarged scale, showing the horizontal boom raised to its non-working position;

Fig. 4 is a view similar to Fig. 3 of the horizontal boom (a portion of which is shown), and showing more particularly the boom mounting means and spray liquid supplying and controlling means;

Fig. 5 is a rear elevation, partially in section of the horizontal boom of Figs. 1, 2 and 3, the supporting casters being omitted in this figure;

Fig. 6 is a top plan view of the same;

Fig. 7 is a vertical longitudinal section through the boom;

Fig. 8 is a vertical section through the inner end of the boom, showing in detail the mode of mounting the spray pipe in the shield and mode of mounting the shield on the frame of the carrier vehicle;

Fig. 9 is a top plan view of the parts shown in Fig. 8;

Fig. 10 is a view mainly in vertical section on line 10—10 of Fig. 9 through the mounting parts of the boom structure shown in Figs. 8 and 9;

Fig. 11 is a detail section through the inner end of the boom looking toward the boom mounting and spray liquid supplying connections;

Fig. 12 is a front elevation, partly in vertical section, showing on an enlarged scale a portion of the boom and parts of its mounting and the boom oscillating means;

Figs. 13, 14 and 15 are transverse sections through the boom, illustrating different spraying positions of the spray pipe; and Fig. 16 is a view showing the boom supporting bracket plate and its mode of attachment to the carrier vehicle frame.

Referring now more particularly to the drawings, and especially to the embodiment of the invention disclosed in Figs. 1 to 16, inclusive, I designates a suitable carrier vehicle adapted to be drawn or propelled in any suitable manner over the ground, and 2 designates my improved spray boom applied thereto. The vehicle I may be one supported on wheels or runners and capable of being steered or of being attached to another steerable vehicle which is drawn by one or more draft animals, or is motor propelled, and I do not limit myself in any of these particulars or to the use of any particular type of carrier vehicle. In the present instance I have shown a wheeled type of vehicle to which the boom 2 is applied, on which vehicle is mounted a tank 3 to contain the liquid or solution to be sprayed, which may be supplied to the boom under a desired high pressure. A suitable construction of pumping means (generally indicated at 3') may be employed on the vehicle for this purpose and to force the liquid to the sprayer through a supply pipe 4 having arranged therein a suitable pressure gauge 5 and one or more controlling and cut-off valves 6. The delivery end of this pipe is preferably arranged at one end of the vehicle, and at this end of the vehicle is provided a railed platform 7 on which an operator may stand in a position to operate the valve or valves 6 and other controls to govern the supply of liquid to and the working operations of the spray boom. At this end of the vehicle may also be mounted all of the vehicle controls, which are not shown herein as they may be of any conventional type, thus allowing the vehicle to be driven and the boom to be operated by the driver of the vehicle, namely, a single operator standing on the platform.

The boom 2 comprises in its construction a longitudinally channeled guard or shield 8 made of some strong and durable sheet metal or other suitable material. This guard has a main horizontal base or shoe portion 9 terminating at its rear edge in an upstanding flange 10, an upwardly and forwardly inclined guide plate or fender portion 11 at the front of the shoe, an inwardly and rearwardly inclined nozzle guard plate or apron 12, and a curved or rounded nose or fender portion 13 joining the forward edges of the plates 11 and 12. The shoe 9 forms a stable support to adapt the guard to run in contact with the ground, if desired, or in close proximity thereto, while the plate 11 serves as a guide runner to guide the guard over stones and other obstructions to adapt the guard to slide easily over the same without injury to the boom. The nozzle guard plate or apron 12, as shown, projects rearwardly over the plate 11 and the forward portion of the shoe 9 and terminates forwardly of the flange 10 and above the horizontal plane thereof and in vertical alinement with the vertical longitudinal center of the shoe 9. By this construction a longitudinal slot or opening 14 is provided at the upper rear portion of the guard for the mounting of the spray pipe and nozzle and to admit of their movements and the discharge of the spray in the manner hereinafter described. The plate 12 serves not only to protect the spray pipe and nozzles from injury by contact with tree limbs and other growing vegetation or obstructions, but also provides a lifting means to engage under the low lying limbs or branches of trees or plants as the boom travels forward, and to elevate such limbs or branches to cause them to pass over the slot 14 and within the spraying zone of the nozzles, so that the branches will be effectively sprayed and prevented from acting as obstructions to the travel of the boom. A further important function of the channeled guard or shield is to protect overlying tree branches and any fruit carried thereby from the spray nozzles, thus preventing injury to the branches and possible loss of part of the crop.

The spraying means is designed and adapted to be mounted in the guard or shield so that it may be manually or automatically adjusted or oscillated to discharge the spray through the slot vertically upward, or horizontally, or at an angle through an arc of approximately 180° between limits at the front and rear of the boom. As structurally embodied in the boom shown in Figs. 1 to 16, inclusive, the spraying means consists of a spray pipe or pipes 15 (one or more) extending longitudinally of the slot 14 adjacent to and just below the level of the inner edge of the apron 12 and carried by bearing links or brackets 16 secured to the upper rear edge 17 of the apron. Two or more parallel pipes may be used, which may be in the same horizontal plane or may be arranged in different planes, as desired. The pipe 15 is coextensive in length, or substantially so, with that of the guard 8, and is provided at desired intervals with discharge openings in which may be welded or otherwise secured the nipples of spray nozzles 18 of suitable type. These nozzles may be constructed to discharge the spray in concentrated, spread or whirling streams. The nozzles may be arranged at equal or unequal distances apart and in the same or different planes, and, if desired, the pipe may be provided with other openings normally closed by caps or plugs 19, on removal of which other nozzles may be applied, so that any desired number and spacing of nozzles may be employed. Where a plurality of pipes are used the nozzles may be disposed to discharge at different angles or to discharge overlapping sprays. The pipe 15 is fixed to swing with or is journaled to rotate in the links or brackets 16 so that it may be oscillated to dispose the nozzles in a forward position, to discharge the spray directly upward vertically, as shown in Fig. 13, or to dispose them in a rearward position to discharge the spray horizontally over the flange 10, as shown in Fig. 15, or to dispose them in any intermediate position, as shown, for example, in Fig. 14, to discharge the spray upwardly at different angles between the vertical and horizontal.

It will be observed that the nozzles 18 are arranged to swing clearly in the opening 14 below the level of the rear portion of the apron 12, and to be guarded thereby against injury by tree or plant limbs sliding over the guard. It will also be observed that the guard, constructed in the manner described, generally comprises a lower shoe portion to ride upon the ground, an upper shield or apron overhanging and protecting the sprayer, a spray discharge opening at the upper rear portion of the guard, and inclined portions forming a V-shaped nose closing the space between the shoe and apron at the front of the guard, said inclined portions having the guiding functions hereinbefore described.

Means are provided for mounting the boom in a novel manner on the frame of the carrier vehicle 1 and for supplying spray liquid to the spray pipe and oscillating said pipe, all of which I will now proceed to describe.

Fixed to and extending along the upper surface of the shoe plate 9 is a reinforcing and supporting bar 20. One end of this bar terminates at or projects a distance beyond the inner end of the guard 8 and has fixed thereto, as by suitable fastening means 21, the outer end of a tube 22 which is telescopically received by a second tube 23, the outer end of the tube 23 being longitudinally split, as shown at 24, and adapted to be contracted about and clamped to the tube 23 by a clamping collar or sleeve 25. The opposite or inner end of the tube 23 is pivotally connected, as at 26, to the lower end of a post or standard 27 which is vertically adjustable and slidable in a split T-collar or bracket sleeve 28 and adapted to be limited in downward movement thereon by a stop collar 29. Fixed to the T-collar 28 is a split tube or pipe clamp 30 which telescopically receives a rod or tube 31 welded to a bracket plate 32, a clamping collar 33 being provided to detachably clamp the pipe clamp 30 to the tube 31, whereby the bracket sleeve or collar 28 is mounted on the bracket plate 32. The bracket plate 32 is arranged to bear upon one of the side frame beams 34 of the vehicle 1 and is provided with slots 34' (Fig. 16) for the passage of clamp bolts 35 engaging the beam 34, whereby the bracket plate 32 is adjustably mounted on the beam and adapted to be fixed in adjusted position thereon. The boom is thus mounted at one end upon the frame of the vehicle 1 so that it may be disposed in a normal horizontal working position, as shown in full lines in Figs. 1 and 2, in which it extends laterally from the vehicle, and so that it may be swung upon the pivot 26 to an inoperative substantially vertical position, as shown in Fig. 3, to which it may be drawn and in which it may be held by any suitable means, allowing the apparatus as a whole to be transported, without interference from the boom, from place to place and to be stored when not in use within a minimum amount of space. It will be obvious from the foregoing that the adjustable connection between the bracket tubes 22, 23 adapts the boom to be adjusted as to length so as to extend a greater or less distance from the carrier vehicle, that the adjustable connection between the post 27 and bracket sleeve 28 adapts the boom to be adjusted vertically to suit varying levels of ground surface with relation to the vehicle frame, and that the adjustable connection between the bracket plate 32 and frame bar 34 allows a further vertical adjustment between the boom and vehicle frame to be made. Either of these vertical adjustments may be employed without the other, and both adjustments may be made if required and if found best for a working operation. A feature of the invention resides in the fact that as the post 27 fits somewhat loosely in the sleeve 28 the post is allowed to have vertical up and down play and is adapted to drop downward with the boom and permit the latter to drop from one ground level to a lower ground level or move from a low level to a higher level in the event of such a change of level occurring in the working travel of the apparatus over uneven ground. Also, the pivotal connection 26 adapts the boom to swing up or down to conform to slope variations or like irregularities of ground surfaces. All of these changes of position of the boom to accommodate itself to ground surface variations are automatic and obtained in a simple manner and without effort on the part of the operator. A rope or cable 1ᵃ, fastened at one end to the outer end of the boom, and adapted to be fastened at its opposite end to a part of the vehicle or to the frame of the platform 7, may be provided and suitably arranged to stay the boom against rearward swing under drag resistance and/or to adapt the boom to be swung upward to non-working position, as shown in Fig. 3, and fastened in such position. Furthermore, by loosening the clamp 25 the tube 22 may be rotated with relation to the tube 23, and then fixed thereto by tightening the clamp 25, so that the boom may be tilted about a horizontal axis to adapt it to travel in a tilted position, i. e., with its guard nose disposed at a greater than normal angle to the ground surfaces.

The means for supplying the spray liquid or solution to the pipe 15 and oscillating the latter may be of any suitable construction, but as shown in the present instance comprises a T-coupler head 36 provided at the inner end of the pipe and having elbow arms 37 and 38 adapted for connection with feed pipes 39, 39, which are preferably flexible hose pipes, leading from the supply pipe 4, from which the supply of liquid to the spray pipe may be controlled by operation of the control valve or valves 6. These flexible pipes permit the spray pipe to be freely oscillated in its bearing brackets, and the arms 37 and 38 are adapted to serve as crank arms through which oscillating motion may be transmitted to the pipe. Any suitable means, manually or automatically operable, may be provided for the purpose of transmitting such motion to the pipe, and the same or coacting means may be used to lock the pipe in any of its spraying positions. As at present embodied (Figs. 3, 4 and 12) cables or sprocket chains 39' are connected to the arms and pass over a pulley or sprocket wheel 40 mounted on the platform 7 and associated with a hand wheel 41 or its equivalent whereby, by turning the hand wheel in one direction from a normal position and back again, motion may be transmitted to oscillate the spray pipe to direct the discharging spray through an arc for an efficient spray spreading action. The cables or chains 39' may be provided with tension springs 39ˣ to keep the tension of each cable or chain automatically adjusted at all positions, and the hand wheel 41 or its shaft may be provided with a toothed or recessed locking wheel or its shaft may be provided with a toothed or recessed locking wheel or disk 41' and a pawl or locking dog 42 of suitable type may be provided to engage the same whereby the spray pipe may be locked in a plurality of positions, to spray vertically, horizontally or at an intermediate angle. These operating and controlling parts are arranged in a position to be conveniently manipulated by an operator standing on the platform, who may direct the spray in a manner to secure the best spraying actions as conditions may require in the travel of the boom.

It will thus be understood that in the operation of the apparatus, and in its course of travel through an orchard, field or cultivated plot, the boom will be caused to move at a low level along the surface of the ground so as to pass beneath the limbs or branches of the leaves or plants, and in such course of travel the sprayer may be operated to project the spray upward vertically, or horizontally, or at an angle to the horizontal at will and as required to more thoroughly spray the trees or plants than is possible with sprayers discharging vertically or horizontally at a high level. As it travels the boom will also lift all low lying branches or limbs so that these will be sprayed, with the result that low level branches or limbs will be completely sprayed without employing drenching actions involving the use of an undue amount and waste of the solution. It will, of course, be understood that the operator may control the action of the sprayer to cause it to project the spray continuously or for any period of time in any of the directions mentioned or may cause the sprayer to oscillate back and forth continuously to discharge the spray through an arc. As stated, the sprayer may be manually oscillated or it may be oscillated automatically by suitable means, under control of the operator, and driven by the propelling or pumping mechanism, or running gear of the machine, or an eccentric drive mechanism including a driver running in contact with the ground. If desired, the boom may be equipped with one or more caster or other wheels 43 or other means to adapt it to travel easily over the surface of the ground. It will be understood that the use of the end caster wheels 43 is optional and that these wheels may be dispensed with if desired, and even where used such caster wheels or rollers do not interfere with the ground engaging function of the shoe 9 and the inclined plate 11, which inclined plate in any event serves as a guide runner to guide the boom over stones and other obstructions without injury to the spray pipe. Moreover, in case of uneven ground portions of both the horizontal shoe 9 and of the inclined guard or fender 11 may come in contact with the ground even though an end roller 43 be employed to facilitate movement of the boom over smooth or level ground. In addition to the fact that the guard apron serves as a lifter of low lying branches or limbs of trees and other plants, it is to be noted that this apron serves also to deflect and prevent fruit, leaves, twigs, stones and other materials or debris from gaining access to and clogging the nozzles. It acts to push down the growing vegetation of a cover crop so that the sprayer may pass over the vegetation without injury thereto, allowing the vegetation to return to normal position after the sprayer has passed.

While I have shown and described the use of a spray pipe carrying fixed nozzles and which is mounted to swing and/or to rotate for an oscillating action of the character set forth, I desire it to be understood that in practice I may use a stationary spray pipe and mount the nozzles to oscillate, and both of these modes of mounting are to be understood as falling within the spirit and scope of my invention. Also, if desired, and as hereinafter described, the guard or shield may oscillate with the spray pipe and nozzles. It is also within the scope of my invention in its broadest aspects to omit the nozzle oscillating or adjustment feature entirely if desired.

While a specific embodiment of my invention has been disclosed by way of illustration, rather than by way of limitation, it is to be understood that changes in the form, construction and mode of operation and of mounting the parts may be made within the scope of the appended claims, without departing from the spirit or sacrificing any of the advantages of the invention.

I claim:

1. For use with a vehicle carried spraying apparatus, an elongated low carried spray boom having a spray pipe carried thereby and extending generally lengthwise thereof, said spray pipe having spaced upwardly directed discharge nozzles, said boom comprising a channeled guard for the spray pipe, including a front or nose portion and top and base portions extending rearwardly from the nose portion, and having an elongated opening located rearwardly of the nose portion, to permit discharge of spray from the nozzles, the base portion of the guard extending beneath the spray pipe and nozzles and serving to protect them from the underlying ground surface and the top portion serving to protect from low lying limbs or branches during the forward movement of the boom.

2. For use with a vehicle carried spraying apparatus, a ground engaging spray boom comprising a channeled guard having a base portion, a top portion, and a front or nose portion, the said top portion extending rearwardly from the nose portion partially over the base portion and leaving an open spray discharge space at the rear of the guard, and a sprayer carried by the boom to the rear of the nose portion and extending longitudinally of the guard, the base portion of the guard extending beneath the spray pipe and nozzles and serving to protect them from the underlying ground surface and the top portion serving to protect from low lying limbs or branches during the forward movement of the boom.

3. For use with a vehicle carried tree spraying apparatus, a laterally disposed low carried spray boom comprising a channeled guard having a base portion, a top portion, and a closed front or nose portion connected to said base and top portions, the said top portion extending rearwardly from the nose portion partially over the base portion, leaving the guard open at its upper rear portion, and a sprayer extending longitudinally of the guard having a series of upwardly directed nozzles discharging through the open portion of the guard, the base portion of the guard extending beneath the spray pipe and nozzles and serving to protect them from the underlying ground surface and the top portion serving to protect from low lying limbs or branches during the forward movement of the boom.

4. A spray boom comprising a channeled guard having a base portion, a top portion, and a closed front or nose portion, the said top portion extending rearwardly from the nose portion partially over the base portion, leaving the guard open at its upper rear portion, and a sprayer extending longitudinally of the guard and supported in the upper rear portion thereof below the level of the rear edge of said top portion.

5. An elongated spray boom having a spray pipe carried thereby and extending generally lengthwise thereof, said spray pipe having spaced discharge nozzles, said boom having means at one end for attachment to a carrier vehicle, and comprising a channel shaped guard for the spray pipe, including a closed front nose portion and top and base portions extending rearwardly from the nose portion, and having an elongated opening located rearwardly of the nose portion, to permit discharge of spray from the nozzles, the base portion of the guard extending beneath the spray pipe and nozzles and serving to protect them from the underlying ground surface and the top portion serving to protect from low lying limbs or branches during the forward movement of the boom.

6. In a tree spraying apparatus, a traveling vehicle, a horizontally disposed boom carried by the vehicle at substantially ground level and provided with a longitudinal series of spray nozzles, said boom including a fender extending longitudinally of the boom in advance of the nozzles, a base member extending rearwardly from the fender and underlying nozzles to protect the same from the ground surface, and an upwardly inclined top portion extending rearwardly from the fender and serving to prevent contact between the nozzles and overlying tree branches and the like.

7. A vehicle carried tree-spraying apparatus comprising an elongated spray boom, a spray pipe carried by said boom and extending lengthwise thereof, said boom including an elongated channeled guard for the spray pipe having an elongated discharge opening therein, said guard including a front or nose portion in advance of the spray pipe, a base portion underlying the spray pipe, and an inclined guide portion extending upwardly and rearwardly from the nose portion toward the spray pipe.

8. A vehicle carried tree-spraying apparatus comprising an elongated spray boom, a spray pipe carried by said boom and extending lengthwise thereof, said boom including an elongated channeled guard for the spray pipe having an elongated discharge opening therein, said guard including a front or nose portion in advance of the spray pipe, a base portion underlying the spray pipe, and an inclined guide portion extending upwardly and rearwardly from the nose portion toward the spray pipe, said spray pipe having longitudinally spaced discharge nozzles.

9. A vehicle carried tree-spraying apparatus comprising a spray boom projecting laterally from the vehicle at substantially ground level, a longitudinally extending spray pipe carried by said boom and having a plurality of longitudinally spaced nozzles projecting generally upwardly therefrom, a longitudinally extending guard member having a base portion extending beneath the pipe, a closed front or nose portion, and a portion extending upwardly and rearwardly from the nose portion toward the spray pipe but leaving the guard member partially open to permit spray from said nozzles to pass therethrough.

10. A vehicle carried tree-spraying apparatus comprising a spray boom projecting laterally from the vehicle, a longitudinally extending spray pipe carried by said boom and having a plurality of longitudinally spaced nozzles projecting generally upwardly therefrom, a longitudinally extending guard member having an upwardly and forwardly inclined guide portion arranged in advance of the spray pipe, a base portion extending beneath the pipe, a closed and rounded front or nose portion, and a portion extending upwardly and rearwardly from the nose portion over the inclined guide portion but leaving the guard portion partially open to permit spray from said nozzles to pass therethrough.

11. A vehicle carried tree-spraying apparatus comprising an elongated spray boom, a spray pipe carried by said boom and extending lengthwise thereof, said boom including an elongated channeled guard for the spray pipe having an elongated discharge opening therein, said guard including a rounded front or nose portion having oppositely inclined guide portions extending rearwardly therefrom toward the spray pipe, said spray pipe having longitudinally spaced discharge nozzles.

12. A vehicle carried tree-spraying apparatus comprising an elongated spray boom, a spray pipe carried by said boom and extending lengthwise thereof, said boom including an elongated channeled guard for the spray pipe having an elongated discharge opening therein, said guard including a front or nose portion having oppositely inclined guide portions extending rearwardly therefrom toward the spray pipe, said spray pipe having longitudinally spaced discharge nozzles.

ALBERT W. HARZ.

References Cited in the file of this patent and in the parent case

UNITED STATES PATENTS

| Number | Name | Date |
|---|---|---|
| 596,940 | Millspaugh | Jan. 4, 1898 |
| 950,916 | Hayes | Mar. 1, 1910 |
| 978,082 | Wallace | Dec. 6, 1910 |
| 1,043,929 | Heard | Nov. 12, 1912 |
| 1,348,038 | Neumeyer | July 27, 1920 |
| 1,565,404 | Abbott | Dec. 15, 1925 |
| 1,629,160 | Heermance | May 17, 1927 |
| 1,656,171 | Cox | Jan. 17, 1928 |
| 1,974,166 | Thompson et al. | Sept. 18, 1934 |
| 2,132,727 | Foote | Oct. 11, 1938 |
| 2,210,346 | Stayton | Aug. 6, 1940 |
| 2,226,136 | Parker | Dec. 24, 1940 |
| 2,297,110 | Parker | Sept. 29, 1942 |
| 2,301,213 | Kang | Nov. 10, 1942 |
| 2,359,300 | Cartwright | Oct. 3, 1944 |
| 2,365,755 | Griffith | Dec. 26, 1944 |

FOREIGN PATENTS

| Number | Country | Date |
|---|---|---|
| 16,150 | Great Britain | July 7, 1897 |
| 459,155 | France | Aug. 28, 1913 |